United States Patent
Durham et al.

(10) Patent No.: US 10,180,182 B2
(45) Date of Patent: Jan. 15, 2019

(54) TURBINE-PISTON FOR HYDROKINETIC TORQUE CONVERTER AND METHOD OF OPERATION

(71) Applicant: VALEO EMBRAYAGES, Amiens (FR)

(72) Inventors: Patrick Durham, Troy, MI (US); Xuexian Yin, Troy, MI (US); Gyubong Jeon, Troy, MI (US); Alexandre Depraete, Bloomfield, MI (US); Neil Godin, Troy, MI (US)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 15/448,309

(22) Filed: Mar. 2, 2017

(65) Prior Publication Data

US 2018/0252304 A1    Sep. 6, 2018

(51) Int. Cl.
*F16H 45/02* (2006.01)
*F16H 61/14* (2006.01)

(52) U.S. Cl.
CPC .......... *F16H 45/02* (2013.01); *F16H 61/143* (2013.01)

(58) Field of Classification Search
CPC ................... F16H 45/02; F16H 61/143; F16H 2045/0289; F16H 2045/0284
See application file for complete search history.

(56) References Cited

U.S. PATENT DOCUMENTS

| 6,006,877 A * | 12/1999 | Haupt | F16H 45/02 |
| | | | 192/113.34 |
| 2005/0167222 A1* | 8/2005 | Cannon | F16D 33/00 |
| | | | 192/3.29 |
| 2013/0230385 A1 | 9/2013 | Lindemann et al. | |
| 2015/0027110 A1* | 1/2015 | Lindemann | F16H 41/24 |
| | | | 60/338 |
| 2016/0084364 A1* | 3/2016 | Ramsey | F16H 45/02 |
| | | | 415/123 |

* cited by examiner

*Primary Examiner* — Jacob S. Scott
*Assistant Examiner* — Tinh Dang
(74) *Attorney, Agent, or Firm* — Berenato & White, LLC

(57) ABSTRACT

A hydrokinetic torque converter including a secondary piston for purposes of enhancing operation of the lock-up feature, and the method of operating such a converter. The secondary piston moves axially behind the turbine-piston to urge respective lock-up clutch friction surfaces into phased engagement. In an initial phase of engagement, friction surfaces between the secondary piston and turbine-piston engage to begin the reduction of relative rotary motion between the converter impeller and turbine-piston. This initial phase of slowing relative movement between the impeller and turbine-piston reduces pressure within the torus and the associated fluid forces separating the friction surfaces of the lock-up clutch. The secondary piston also slows and eliminates fluid flow from within the torus past the lock-up clutch and further reduces engagement resistance of the lock-up clutch owing to the lessening fluid pressure and flow. A more consistent lock-up clutch engagement, with higher torque capacity, is provided in both driven and coasting lock-up operation.

19 Claims, 3 Drawing Sheets

Fluid Flow - Lockup Off

Fluid Flow - Lockup Initial Phase

TURBINE-PISTON FOR HYDROKINETIC TORQUE CONVERTER AND METHOD OF OPERATION

BACKGROUND OF THE INVENTION

1. Field of the Invention

The present invention generally relates to coupling devices, and more particularly to high torque capacity turbine-piston assemblies for hydrokinetic torque converters, and hydrokinetic torque converters including such turbine-piston assemblies, and the associated operation of such assemblies.

2. Background of the Invention

Typically, a hydrokinetic torque converter includes an impeller assembly, a turbine assembly, and a stator assembly (or reactor). These elements are collectively referred to as the "torus". The stator assembly typically includes a one-way clutch for restricting rotational direction. The turbine assembly is operatively connected, such as by using mechanical fasteners or by integral connection, with an output (or turbine) hub that is linked in rotation to a driven shaft, which operates as or is linked in rotation to an input shaft of a transmission of a vehicle. The casing of the torque converter generally includes a front cover and an impeller shell, which together define a fluid filled chamber. Impeller blades are fixed to an impeller shell within the fluid filled chamber to define the impeller assembly. The turbine assembly and the stator are also disposed within the chamber, with both the turbine assembly and the stator being relatively rotatable with respect to the front cover and the impeller shell. The turbine assembly includes a turbine shell with a plurality of turbine blades fixed to one side of the turbine shell facing the impeller blades of the impeller.

The turbine assembly works together with the impeller assembly, which is linked in rotation to the casing that is itself linked in rotation to a driving shaft driven by a prime mover, such as an internal combustion engine. The stator is interposed axially between the turbine assembly and the impeller assembly.

Conventionally, and it order to enhance the efficient transfer of torque from the impeller to the turbine, a typical torque converter will include a lock-up feature wherein the relative motion between the impeller and turbine is eliminated in certain operational settings. This feature includes some form of clutch and accompanying friction surface between the respective rotating portions of the impeller and turbine, and an actuating piston to urge the clutch into engagement. In addition, to eliminate or reduce the driveline harshness, a vibration damper is also included between the now locked-in-motion impeller and turbine and the output of the torque converter, which is typically the turbine hub.

The lock-up feature is usually used as a mechanism to reduce power losses and enhance efficiency at relatively higher operational speeds of the vehicle in which such a system has been installed, e.g., at highway speeds. Increasingly, however, as gearboxes have had a proliferation of ratios, e.g., 8 and 9 forward ratios, the lock-up feature is being used at lower and lower speeds, e.g., in town, to enhance efficiency and also in certain "sport" settings to enhance, for example, the slowing effect of engine braking on the drivetrain. As a result, the once limited operation lock-up feature now is used in a variety of additional operational settings. In this regard, and to reduce or eliminate driveline harshness and poor driving feel, e.g., unpredictable operational characteristics of the drive train, the lock-up feature operation should at all times, ideally, be predictable and effective. That is, the lock-up feature should engage in a predictably short time frame and have a torque capacity to handle the operational demand of the drivetrain.

In a known torque converter with a lock-up feature, for example US 2013 0230385, the lock up feature has differing operational and torque absorption characteristics depending on whether the impeller is driving the turbine or whether the turbine is being driven by the driveline, i.e., in a "coasting" mode. Two factors play a role in the lock-up characteristic of the clutch between the impeller and turbine in a coasting mode. First, the hydraulic pressure to actuate the lock-up feature may be insufficient to both lock-up the clutch friction elements and to also, simultaneously, overcome the additional fluid force within the "torus" which in coasting mode can push the turbine and impeller apart (owing to coasting, the formerly driven by the impeller turbine is now driven by the driveline and is pushing fluid against the impeller). Second, because of the additional fluid pressure, the torque capacity of the friction elements is diminished, leading to a "slow" lock-up characteristic. This changing "feel" of the lock-up feature, i.e., the rapidity and certainty thereof, is then dependent on which direction torque is being transmitted through the torque converter assembly. This may not be satisfactory from a drivetrain operational perspective.

SUMMARY OF THE INVENTION

An aspect of the invention provides a torque converter assembly that has rapid and high torque lock-up characteristics, preferably whether the driveline is in "drive" or "coast" mode. A secondary piston (or reaction plate) is employed to assist a turbine-piston during the lock-up operation. By inclusion of a secondary piston, the lock-up operation is phased between an initial engagement phase and a subsequent lock-up phase. In the initial engagement phase, contact is made between the respective friction elements of the secondary piston and the turbine-piston, thus slowing the rotational speed differential between the impeller (which is non-rotatably connected to the secondary piston) and the turbine-piston. In the subsequent lock-up phase, lock-up between the turbine-piston and the impeller occurs. The reason for the phasing, and the advantage derived thereby, is that when the differential rotation between the impeller and turbine are equalized, the hydrodynamic thrust pressure inside the torus is likewise reduced. The reduced pressure inside the torus speeds the lock-up phase and enhances the torque capacity of the clutch. Further, in one version of the disclosed device, the secondary piston structure acts as a seal to prevent fluid from flowing between the casing chamber behind the turbine piston into the torus. This fluid, that could otherwise flow around the lock-up device, instead urges the turbine piston more affirmatively into engagement with the lock-up friction surface(s).

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
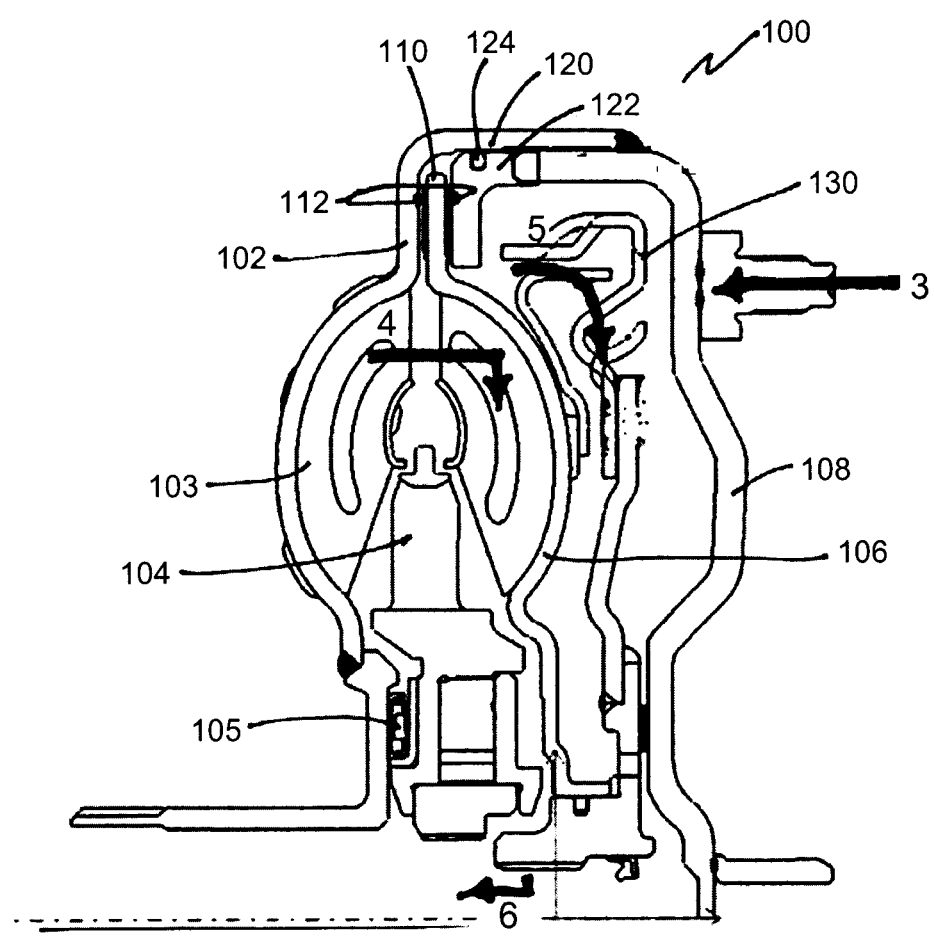
FIG. 1 is a top half cross-sectional view of a hydrokinetic torque converter with a turbine-piston and secondary piston assembly in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, FIGS. 1-5, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

A torque converter 100 including a secondary piston 122 for actuation of the lock-up feature 110 between the impeller 102 and turbine 106 is shown in a top half partial section in FIG. 1. The torque converter 100 includes an impeller 102 including vanes 103 located on an inner side of the front surface of the casing of the torque converter 100. A turbine-piston 106 is located in an axially opposed manner to the impeller 102, with a stator 104 equipped with one-way clutch 105 positioned axially therebetween. The torque path through the torque converter is schematically represented by incoming torque arrow 3, i.e., from an internal combustion ("IC") engine, into the casing/impeller 102 via arrow 4, to the vaned turbine-piston 106, arrow 5, through the damper 130, and out through the hub of the turbine via arrow 6 to the input shaft (not shown) of a multi-ratio transmission. Rearward casing portion 108 is attached (via welding for example) to the impeller 102 to create, along with the front cover/impeller 102, a fluid tight compartment surrounding the torus elements (i.e., the impeller 102, the stator 104, and the turbine piston 106) as well as the elements making up the lock-up clutch 110, and a vibration damper system 130.

The lock-up clutch 110 system includes a secondary piston 122, sealed around its perimeter to the surrounding casing 108 via seal 124, which may be an o-ring or equivalent. The secondary piston 122 can move toward and away with respect to the outer casing 108 and is fixed in rotation with respect to the outer casing 108, for example via splines or tabs 120. See FIG. 5. The secondary piston 122 includes a forwardly facing secondary-piston perimeter friction surface portion 113 oriented to engage a (rearwardly oriented) first turbine-piston perimeter friction surface portion 112a of the turbine-piston 106. The opposite side of the turbine-piston 106 includes a (forwardly oriented) second perimeter friction surface portion 112b which faces an impeller perimeter friction surface portion 114 of the impeller 102, as best shown in FIG. 3.

Figure 2:
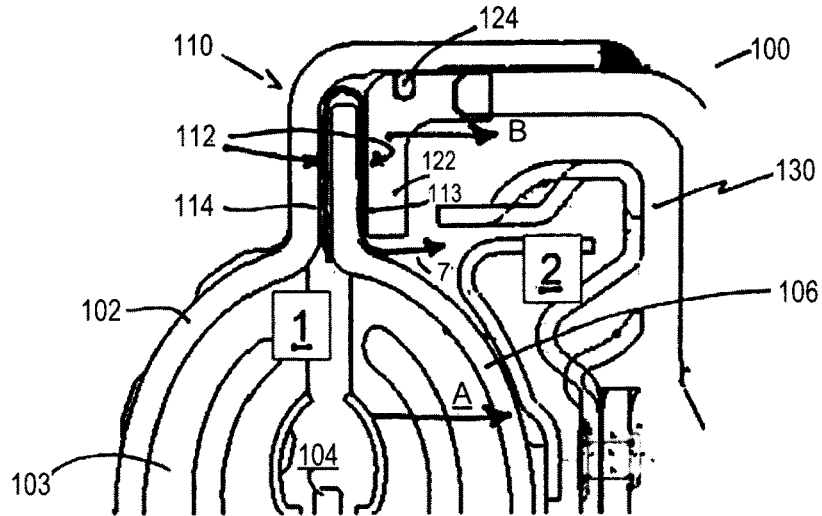
FIG. 2 is an enlarged radially outer cross-sectional view of the assembly of the hydrokinetic torque converter shown in FIG. 1 in lock-up off operation.

In operation, when the lock-up clutch system 110 is disengaged, as best shown in FIG. 2, the impeller vanes act on the fluid contained in a torus chamber 1 and, through this action, provide torque to the opposed turbine-piston 106, thereafter the fluid passes though the vanes of stator 104 and begins the cycle again. Fluid also flows from the torus chamber 1 as shown by arrow 7 around and through the lock-up clutch system 110 and into a casing chamber 2 behind the turbine-piston 106. The pressure/force of the fluid pushes turbine-piston 106 in the direction of arrows A and B, as best shown in FIG. 2.

Figure 3:
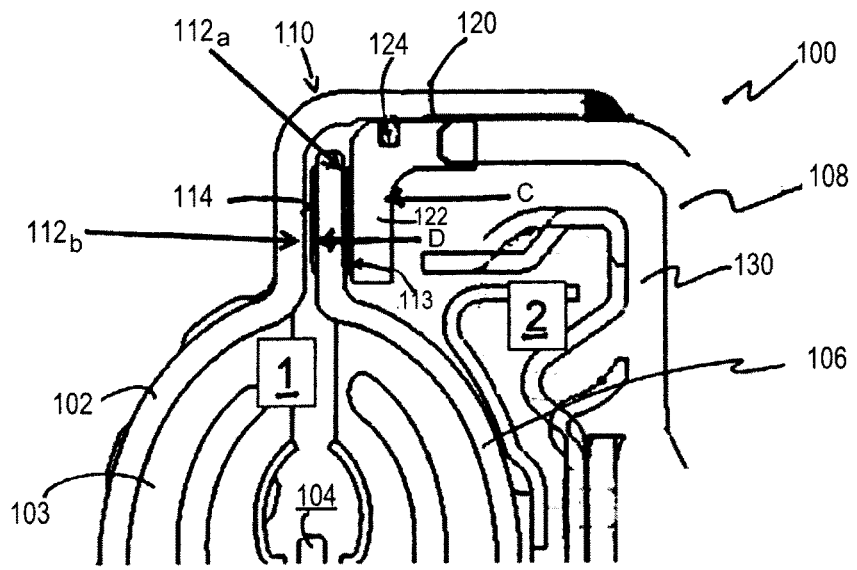
FIG. 3 is an enlarged radially outer cross sectional view of the turbine assembly shown in FIG. 1 in a lock-up initiation configuration.
Figure 5:
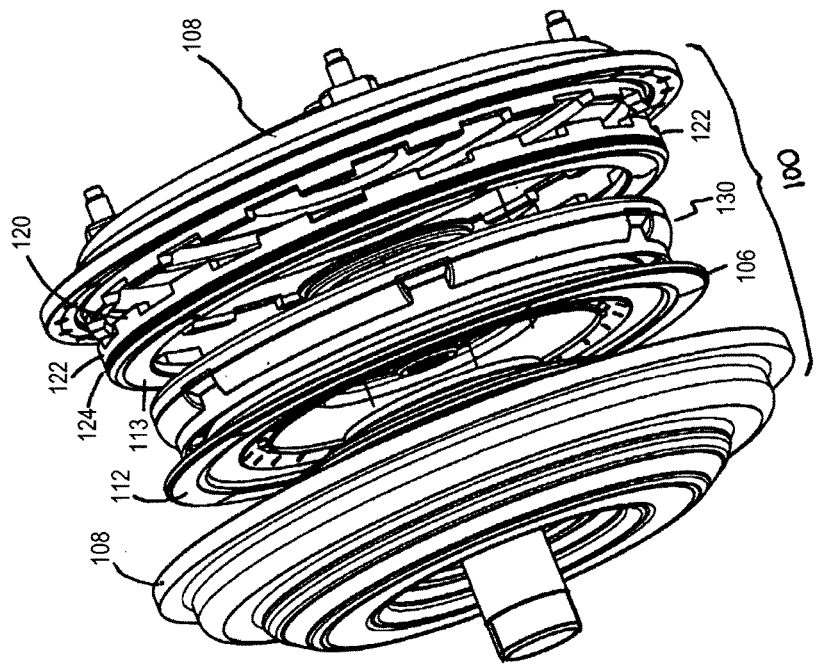
FIG. 5 shows an exploded view of the major components of a torque converter including the secondary piston assembly in accord with the present invention.
Figure 4:
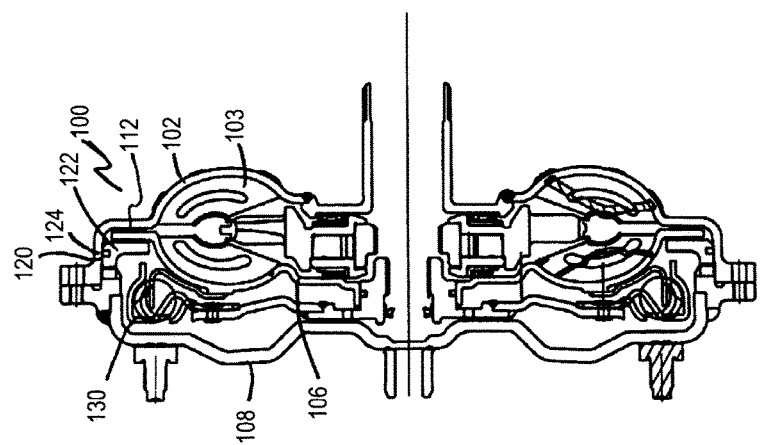
FIG. 4 is a full sectional view of a full lock-up configuration where the secondary piston and turbine piston have fully engaged the front cover of the torque converter.

When fluid pressure is increased on the rearward side of the turbine piston 106, i.e., from right to left in FIGS. 1-3, to engage the lock-up clutch system 110, fluid is now reversed and is directed from casing chamber 2 to the torus chamber 1. As a result, the secondary piston 122 is urged toward the turbine-piston 106, in the direction of arrow C, and causes the first of two perimeter friction surface portions 112 on the turbine-piston 106 to begin to engage with a perimeter friction surface portion 113 on the forward side of the secondary piston 122 as best shown in FIG. 3. Inasmuch as the secondary piston 122 rotates at the same speed as the casing 108 and impeller 102, the speed difference between the turbine-piston 106 and impeller 102 begins to equalize, thus reducing the hydrodynamic forces inside the torus. The hydrodynamic forces, in coast mode, tend to push the turbine-piston 106 away from the impeller 102. In addition, as the gap between the friction surface portions 112a and 113 decreases, fluid flow around the perimeter of the lock-up clutch 110 is substantially reduced. Pressure continues to build in the casing chamber 2 and reduce in the torus chamber 1 and the lock-up clutch now engages, in the direction of arrow D in FIG. 3. In the lock-up phase, as best shown in FIG. 4, the impeller friction surface portion 114 on the impeller (inside of casing 108), and the second turbine-piston friction surface portion 112b on the forward side of the turbine-piston 106 are now forced together. The lock-up configuration is now fully and rapidly engaged. Relative rotational motion between the impeller 102 and turbine-piston 106 ceases.

The phased method of lock-up enabled by the use of a secondary piston 122 allows for a predictable phased engagement of the lock-up feature regardless of the operational demand being placed on the torque converter 100 through the control input. Upshifting and downshifting through the multi-ratio gearbox can be accompanied by a satisfying feel of rapid and certain engagement of the lock-up feature. In addition, owing to the reduction in relative rotational speeds of the impeller 102 and turbine-piston 106 prior to full engagement, one or more of the following advantages can be realized. First, more positive clutch engagement feel; second, less wear and attendant heat build-up on the friction surfaces and in the working fluid; third, lower activation pressures of the lock-up feature and thus less parasitic pumping losses to create such pressures; and/or, fourth, a smoother less jarring lock-up torque bump owing to the initial speed equalization between the impeller and turbine-piston.

The various components and features of the above-described exemplary embodiments may be substituted into one another in any combination. It is within the scope of the invention to make the modifications necessary or desirable to incorporate one or more components and features of any one embodiment into any other embodiment. In addition, although the exemplary embodiments discuss steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torque converter, including a lock-up clutch mechanism, adapted to rotate about an axis, comprising:
    a torus having an interior torus chamber and comprising an impeller having an impeller perimeter friction surface portion, a stator, and a turbine comprising a reactive turbine-piston having opposite first and second turbine-piston perimeter friction surface portions, said turbine being drivable in a rotary direction around said axis by hydrokinetic energy supplied from said impeller;
    a casing associated with said torus and providing a casing chamber in variable fluid communication with said torus chamber and axially juxtaposed to said torus chamber on an opposite side of said turbine-piston relative to said torus chamber; and
    said lock-up clutch mechanism comprising a secondary piston having a secondary-piston perimeter friction surface portion, sealed about a perimeter thereof to said casing, fixed in rotation with respect to said casing, located axially adjacent said turbine piston in said casing chamber,
    wherein said secondary piston is configured to axially move, in response to an effective fluid pressure increase in said casing chamber relative to said torus chamber, to engage said secondary-piston perimeter friction surface portion with said first turbine-piston perimeter friction surface portion, and further configured to thereafter urge said second turbine-piston perimeter friction surface portion into engagement with said impeller perimeter friction surface portion, thereby eliminating relative rotary motion between said turbine-piston and said impeller.

2. The torque converter as in claim 1, wherein said secondary piston is fixed in rotation to said casing via splines.

3. The torque converter as in claim 1, wherein said secondary piston is fixed in rotation to said casing via tabs.

4. The torque converter as in claim 1, wherein said impeller and turbine-piston perimeter friction surface portions extend in a radial direction.

5. The torque converter as in claim 1, wherein said first turbine-piston perimeter friction surface portion faces toward said secondary piston, and said second turbine-piston perimeter friction surface portion faces toward said impeller.

6. The torque converter as in claim 5, wherein said first and second turbine-piston perimeter friction surface portions are clamped between said secondary piston and said impeller perimeter friction surface portion when said lock-up clutch mechanism is engaged.

7. The torque converter as in claim 1, wherein said impeller perimeter friction surface portion, said first and second turbine-piston perimeter friction surface portions, and said secondary-piston perimeter friction surface portion are radially outward of said torus chamber.

8. A method of operating a torque converter, said method comprising:
    providing a torus having an interior torus chamber and comprising an impeller having an impeller perimeter friction surface portion, a stator, and a turbine comprising a reactive turbine-piston having opposite first and second turbine-piston perimeter friction surface portions, said turbine being drivable in a rotary direction around said axis by hydrokinetic energy supplied from said impeller;
    providing a casing associated with said torus and providing a casing chamber in variable fluid communication with said torus chamber and axially juxtaposed to said torus chamber on an opposite side of said turbine-piston relative to said torus chamber;
    providing a lock-up clutch mechanism comprising a secondary piston having a secondary-piston perimeter friction surface portion, sealed about a perimeter thereof to said casing, fixed in rotation with respect to said casing, and located axially adjacent said turbine-piston in said casing chamber;
    increasing fluid pressure in said casing chamber relative to said torus chamber to urge said secondary piston toward said turbine-piston and engage the secondary-piston perimeter friction surface portion with said first turbine-piston perimeter friction surface portion;
    equalizing a rotary speed differential between said secondary piston and said turbine-piston;
    reducing hydrodynamic pressure within said torus; and
    further increasing pressure in said casing chamber relative to said torus chamber so as to urge said second turbine-piston perimeter friction surface portion axially, via movement of said secondary piston, toward and into engagement with said impeller perimeter friction surface portion to eliminate relative rotary motion between said turbine-piston and said impeller.

9. The method as in claim 8, wherein said secondary piston is fixed in rotation to said casing via splines.

10. The method as in claim 8, wherein said secondary piston is fixed in rotation to said casing via tabs.

11. The method as in claim 8, wherein said impeller and turbine-piston perimeter friction surface portions extend in a radial direction.

12. The method as in claim 8, wherein said first turbine-piston perimeter friction surface portion faces toward said secondary piston, and said second turbine-piston perimeter friction surface portion faces toward said impeller.

13. The method as in claim 12, wherein said first and second turbine-piston perimeter friction surface portions are clamped between said secondary piston and said impeller perimeter friction surface portion when said lock-up clutch mechanism is engaged.

14. The method as in claim 8, wherein said impeller perimeter friction surface portion, said first and second turbine-piston perimeter friction surface portions, and said secondary-piston perimeter friction surface portion are radially outward of said torus chamber.

15. The torque converter as in claim 2, wherein said impeller and turbine-piston perimeter friction surface portions extend in a radial direction.

16. The torque converter as in claim 3, wherein said impeller and turbine-piston perimeter friction surface portions extend in a radial direction.

17. The torque converter as in claim 2, wherein said first turbine-piston perimeter friction surface portion faces toward said secondary piston, and said second turbine-piston perimeter friction surface portion faces toward said impeller.

18. The torque converter as in claim 3, wherein said first turbine-piston perimeter friction surface portion faces toward said secondary piston, and said second turbine-piston perimeter friction surface portion faces toward said impeller.

19. The torque converter as in claim 4, wherein said first turbine-piston perimeter friction surface portion faces toward said secondary piston, and said second turbine-piston perimeter friction surface portion faces toward said impeller.

\* \* \* \* \*